United States Patent [19]

Thomas et al.

[11] Patent Number: 5,283,684
[45] Date of Patent: Feb. 1, 1994

[54] METHOD OF CONSTRUCTING CONFOCAL MICROSCOPE COMPONENTS

[75] Inventors: Robert L. Thomas; Lawrence D. Favro, both of Huntington Woods; Pao-Kuang Kuo, Troy; Li Chen, Detroit, all of Mich.

[73] Assignee: The Board of Governors of Wayne State University, Detroit, Mich.

[21] Appl. No.: 922,931

[22] Filed: Jul. 31, 1992

Related U.S. Application Data

[62] Division of Ser. No. 734,398, Jul. 23, 1991, Pat. No. 5,162,941.

[51] Int. Cl.⁵ .................................................. G02B 5/30
[52] U.S. Cl. ...................................... 359/234; 359/368; 359/565; 359/900
[58] Field of Search ........................... 359/233–236, 359/368, 896, 900, 565, 569

[56] References Cited

U.S. PATENT DOCUMENTS

| | | | |
|---|---|---|---|
| 3,013,467 | 12/1961 | Minsky | 359/368 |
| 3,853,398 | 12/1974 | Kano | 355/43 |
| 4,312,330 | 1/1982 | Holdridge | 126/440 |
| 4,787,722 | 11/1988 | Claytor | 359/742 |
| 4,802,748 | 2/1989 | McCathy et al. | 359/368 |
| 4,824,229 | 4/1989 | Narita et al. | 359/393 |
| 4,925,284 | 5/1990 | Ward et al. | 359/393 |
| 5,022,743 | 6/1991 | Kino et al. | 359/235 |
| 5,067,805 | 11/1991 | Corle et al. | 359/235 |

OTHER PUBLICATIONS

Petran et al. "Tandem Scanning Reflected Light Microscope", Scanning, vol. 7, pp. 97–108 (1985).

*Physics Today*, Special Issue: The Physics of Imaging, Sep. 1989, pp. 55–62 by Gordon S. Kino and Timony R. Corle.

*Scientific American*, Mar. 1991, pp. 76–81, "Nonimaging Optics".

*Handbook of Biological Confocal Microscopy*, edited by James B. Pawley, revised edition, Chapters 1, 2, 10, and 11.

Primary Examiner—Bruce Y. Arnold
Assistant Examiner—James Phan
Attorney, Agent, or Firm—Dykema Gossett

[57] ABSTRACT

A method for constructing a Nipkow disk using a zone plate disk, comprises the steps of constructing a zone plate disk, including the substep of disposing a plurality of focusing means a long a disk, wherein the plurality of focusing means have a common focal distance; placing a photographic plate at the focal distance of the plurality of focusing means; illuminating the plurality of focusing means with a light source such that the illumination is passed through the plurality of focusing means and focused onto the photographic plate thereby creating an image of a plurality of points of focused illumination; and capturing the image created on the photographic plate and using it to construct the Nipkow disk.

4 Claims, 3 Drawing Sheets

METHOD OF CONSTRUCTING CONFOCAL MICROSCOPE COMPONENTS

This is a divisional of co-pending application Ser. No. 07/734,398 filed on Jul. 23, 1991, now U.S. Pat. No. 5,162,941, issued Nov. 10, 1992.

BACKGROUND OF THE INVENTION

The present invention relates generally to microscopy and more specifically to an improved confocal microscope.

The art of microscopy deals with the development of methods and instruments for magnifying. A significant portion of microscopy deals with using light from the visible portion of the spectrum to illuminate the sample to be magnified. This aspect of the art of microscopy is known as light microscopy.

It is well understood that many factors influence the maximum axial and lateral resolution attainable using light microscopy techniques. One of these limiting factors is the field size. Specifically, when the field of view of a lens is extremely small, the axial and lateral resolution of the image being magnified can in fact be greater than when the field of view of the lens is broad (or not limited). These theoretical considerations set the stage for the development of an apparatus known as the confocal microscope.

In U.S. Pat. No. 3,013,467 (hereinafter '467) issued on Dec. 19, 1961 to M. Minsky (see FIG. 1), a confocal microscope is disclosed. In this patent, Minsky discloses specimen 22 mounted upon the reflective surface of mirror 15. A beam-splitting plate 17 is interposed between the collimating plate or wall 14 and lens 11. The reflective surface of beam-splitting plate 17 faces lens 11, while the transparent surface of plate 17 faces pin hole aperture 16.

The light reflected from bulb 10 by reflector 12 is collimated by pin hole aperture 16 of plate 14 to provide a point source of light A. Divergent beam B,B passes through beam-splitting plate 17 and then through lens 11 becoming convergent beam C,C. Focal point D of beam C,C is located on specimen 22 and becomes divergent beam E,E which is reflected from mirror 15 back through lens 11. Lens 11 forms convergent beam F,F which is reflected perpendicularly from beam-splitting plate 17 as indicated by beams F',F' which converge to their focal point G at pin hole aperture 26 of plate 24. Photoelectric cell 28 is located in alignment with aperture 26 to measure the intensity of the light passing therethrough. Because pin hole apertures 16 and 26 lie upon the optical axis OA of the confocal microscope of FIG. 1, the point source of light A and the specimen point of illumination D both originate on optical axis OA, while the point image G terminates on the optical axis OA. Therefore, all of the light rays accepted by photoelectric cell 28 must pass through specimen 22 at point D an optical axis OA and pass again through optical axis OA at point G. Light scattered from points other than point D of specimen 22 is, for the most part, rejected from the optical system. Such scattered rays may pass through and be refracted by lens 11 but will not be directed to pin hole aperture 26. Rather, this scattered light will strike the body of plate 24 and be rejected from the optical system. Such rays can re-enter the optical system only by again being scattered, and the possibility of this scattering taking place along a line through point D on optical axis OA is remote. Pin hole aperture 26 increases the optical resolution of the system by its action of squaring the intensity pattern distribution of the image defraction.

Because the confocal microscope of FIG. 1 provides a high degree of selectivity, the following advantages are gained:

(1) minimum image blurring,
(2) increase in signal-to-noise ratio,
(3) increase in effective resolution,
(4) high resolution light microscopy through unusually thick and highly scattering specimens, and
(5) very narrow depth of focus.

As was discussed above in conjunction with the prior art confocal microscope of FIG. 1, the optical system disclosed therein brings into focus the light originating at a single point on the optical axis. Thus, if one desires to look at several portions of sample 22, some means must be provided to move the point of specimen illumination D. Minsky discloses one such means in his '467 patent which involves continually moving (or scanning) sample 22 relative to the optical system. Although this technique works satisfactorily for small samples, larger samples cannot be easily adapted to this type of scanning and alternative methods are used.

One alternative to the above-mentioned method of moving the sample relative to the optical system, involves the technique of moving (or scanning) specimen illumination point D relative to sample 22. Although several different techniques may be used to accomplish the scanning of illumination point D, a popular technique involves using a spinning opaque wheel 90 (also known as a Nipkow disk) that is perforated by a series of pin holes 92 (see FIG. 2A). The successive holes are placed at a constant angle apart 94 around the center of disk 90 but on a constantly decreasing radius 96 (i.e. arranged as an Archimedes spiral). The basic idea behind the Nipkow disk is instead of using a single pin hole 16 in plate 14 and moving sample 22, a large number of pin holes are placed in plate 14 thereby providing a means of scanning specimen illumination point D while maintaining specimen 22 stationary. Pin holes 92 are sufficiently separated so that there is no interaction between the images formed by the individual pin holes. The complete image is formed by moving the pin holes so as to fill the space in between them. Typically, moving the pin holes involves rotating disk 90 about its center. The pin hole arrangement seen in the prior art Nipkow disk of FIG. 2A would produce a raster scan pattern across sample 22 as depicted in FIG. 2B.

Although the basic concepts of confocal microscopy are understood and documented (for example see generally *Handbook of Biological Confocal Microscopy*, edited by James B. Pawley, Integrated Microscopy Resource for Biomedical Research University of Wisconsin-Madison, Madison, Wisconsin, revised edition, Plenum Press, New York and London, specifically see Chapter 1, Foundations of Confocal Scanned Imaging in Light Microscopy; Chapter 10, Intermediate Optics in Nipkow Disk Microscopes; and Chapter 11, The Role of the Pin Hole in Confocal Imaging Systems, also see *Physics Today*, September 1989, by Gordon S. Kino of Stanford University), current designs continue to be improved upon. For example, notwithstanding the above-mentioned advantages associated with using a Nipkow disk to scan the light source across the sample, a major disadvantage is that the Nipkow disk blocks typically 99% of the illuminating light requiring the use of a very intense light source (such as an arc lamp or laser). In addition to the above drawback, the use of Nipkow disks also produces a high percentage of reflected light (light which does not pass through the pin hole opening of the disk) which, in turn, causes artifacts in the final image.

Accordingly, it is an object of this invention to provide a Nipkow disk scanning system which has an improved transfer efficiency between the light source and the specimen point of illumination.

It is a further advantage of this invention to provide an improved optical scanning system which reduces the percentage of reflected light thereby reducing errors due to artifacts.

It is still a further advantage of this invention to provide an optic system for use on a confocal microscope employing Nipkow disk scanning which offers superior transfer efficiency between the illumination source and the sample being illuminated.

SUMMARY OF THE INVENTION

In light of the foregoing objects, the present invention provides a confocal microscope comprising a light source for illuminating a portion of a specimen and an aperture plate disposed between the light source and the specimen. The aperture plate includes an aperture for passing a portion of the light emanating from the light source onto a portion of the specimen. Means is disposed between the light source and the aperture plate for focusing a portion of the light onto the aperture of the aperture plate. Objective means is disposed between the aperture plate and the specimen for focusing the light passing through the aperture onto the specimen for illuminating a portion of the specimen. Means, optically coupled to the illuminated portion of the specimen, is provided for collecting an image created by the light illuminating a portion of the specimen. By focusing a portion of the light onto the aperture of the aperture plate, most of the light directed toward the aperture plate passes through the aperture plate therefore increasing the transfer efficiency of light through the aperture plate.

In a preferred embodiment of the present invention, the focusing means includes a Fresnel zone plate. In an alternative embodiments, the focusing means includes a Fresnel lens, microlens, or a microfunnel concentrator.

In a preferred embodiment, the aperture plate includes a plurality of apertures and the focusing means includes a plurality of lens means, each said lens means respectively associated with an aperture of said aperture plate, and wherein each said lens means is adapted to focus light emanating from the light source onto respectively associated aperture in said aperture plate. Preferably, rotating means is coupled to the aperture plate and the focusing means wherein the rotating means is adapted to synchronously rotate the aperture plate and the focusing means about a common axis of rotation.

The apertures arranged in the aperture plate are preferably in the form of an Archimedes spiral and the plurality of lens means is preferably arranged in the form of an Archimedes spiral that identically matches the Archimedes spiral of the aperture plate.

In a preferred embodiment of the present invention, the image collecting means includes a quarter wave plate disposed between said aperture plate and said objective means and a polarizing beam splitter disposed between said aperture plate and said objective means. The quarter wave plate and the polarizing beam splitter are adapted to collect the image by separating the light emitted from the specimen from the light emanating from the light source.

Preferably the light source provides a source of polarized laser light.

DETAILED DESCRIPTION OF THE PREFERRED EMBODIMENTS

Figure 1:
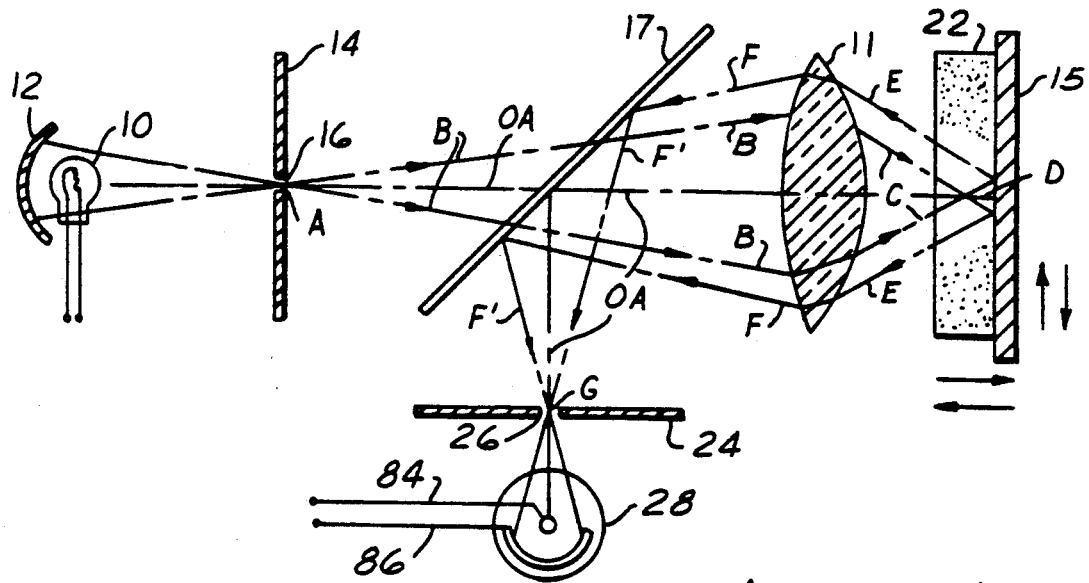
FIG. 1 is a diagrammatic view of a prior art confocal microscope.
Figure 3:
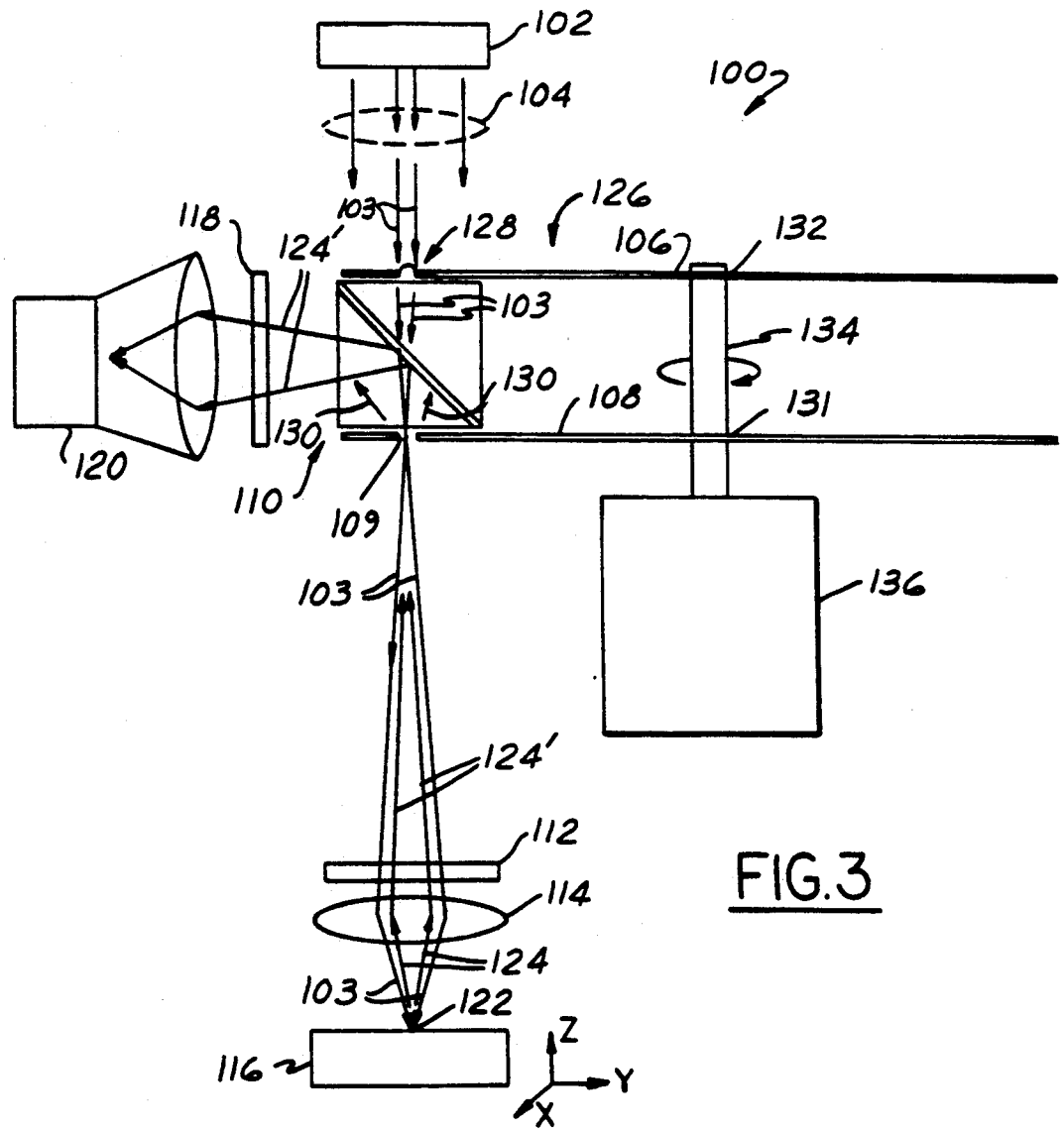
FIG. 3 is an embodiment of the improved confocal microscope of the present invention.

Now referring to FIGS. 1 and 3, in many respects the confocal microscope of the present invention operates identically to that disclosed in previously discussed confocal microscope of Minsky (as set forth in FIG. 1). Similar to the technique disclosed by Minsky in the '476 patent, light source 102 (which is preferably a polarized laser light source) is used to radiate light beam 104 which, in part 103, passes through pin hole 109 of Nipkow disk 108. After, light beam 103 passes through pin hole 109, it falls upon quarter wave plate 112 wherein it is circularly polarized and focused by objective lens 114 upon point 122 of sample 116. A portion of the light 103 focused upon point 122 of sample 116 is scattered and becomes divergent beam 124. Circularly polarized beam 124 passes through quarter wave plate 112 wherein it becomes linearly polarized beam 124' and is focused on pin hole 109 by objective lens 114. Because beam 124' has its plane of polarization rotated by 90 degrees relative to beam 103 (by virtue of its two time traversal of quarter wave plate 112), it is separated from beam 103 by polarizing beam splitter 110 and directed through analyzer 118 into viewing system 120. Analyzer 118 can be constructed from any suitable polarizing medium. Viewing system 120 preferably comprises a video camera to record the incoming image and a video display system to allow the image to be viewed.

As seen from the above description, the primary difference between the confocal microscope of the present invention and that disclosed in the prior art of FIG. 1 lies in the use of zone plate disk 106. The structure and function of zone plate disk 106 will now be described in conjunction with the improved confocal microscope of the present invention.

As shown in FIG. 3, zone plate disk 106 is comprised of an opaque body portion 126 and one or more focusing elements 128 disposed in and supported by zone plate disk 106. It is easy to understand from the configuration set out in FIG. 3, that by disposing focusing element 128 between polarizing light source 102 and pin hole 109 a greater percentage of light is passed through pin hole 109 than would otherwise pass therethrough if focusing element 128 were not used. This is because focusing element 128 collects light 103 and focuses it through pin hole 109. Thus by using focusing element 128 two of the shortcomings of prior art confocal microscope systems are overcome. Firstly, reflected light 130 is greatly reduced when using focusing element 128 by virtue of the fact that most of the light from light source 102 is focused on pin hole 109, leaving less light to reflect 130 from disk 108, as compared to systems using only a Nipkow disk. This reduction in reflected light results in reduction of image artifacts thereby increasing system signal-to-noise ratio. Secondly, because there is an increase in transfer efficiency between light source 102 and pin hole 109, a corresponding increase in the intensity of the image and/or a decrease in the required source intensity is achieved.

Figure 2A:
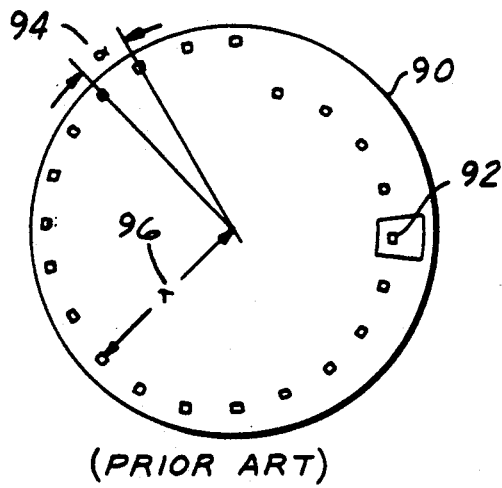
FIG. 2A is a plan view of a prior art Nipkow disk.
Figure 2B:
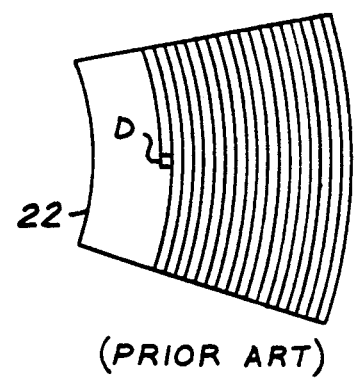
FIG. 2B is an illustration of a scanning path across a sample created by the Nipkow disk of FIG. 2A.

For the sake of simplicity and understanding, the description of zone plate disk 106 and Nipkow disk 108 has herein been limited to a single focusing element 128 in conjunction with a corresponding single pin hole 109. As was discussed in conjuntion with FIGS. 2A and 2B of the prior art, many advantages can be obtained by using a plurality of apertures 109 in the Nipkow disk and a plurality of focusing elements 128 within zone plate disk 106. Such an embodiment will now be discussed in conjunction with FIGS. 4 and 5.

Figure 4:
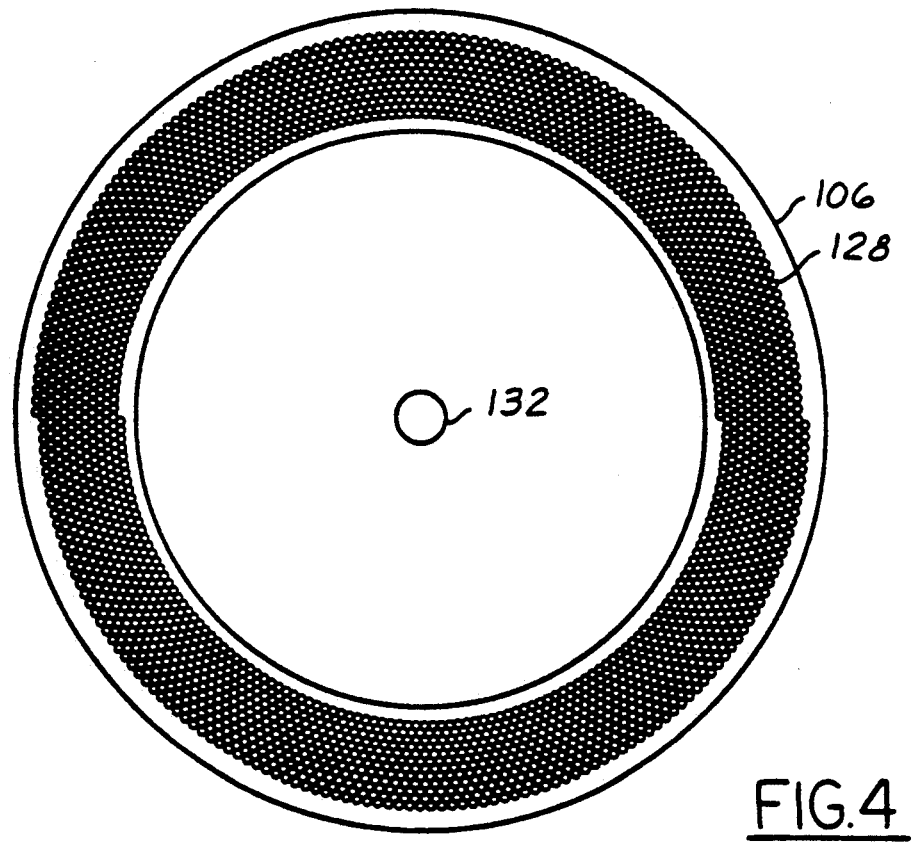
FIG. 4 is a plan view of an embodiment of the zone plate of the present invention.
Figure 5:
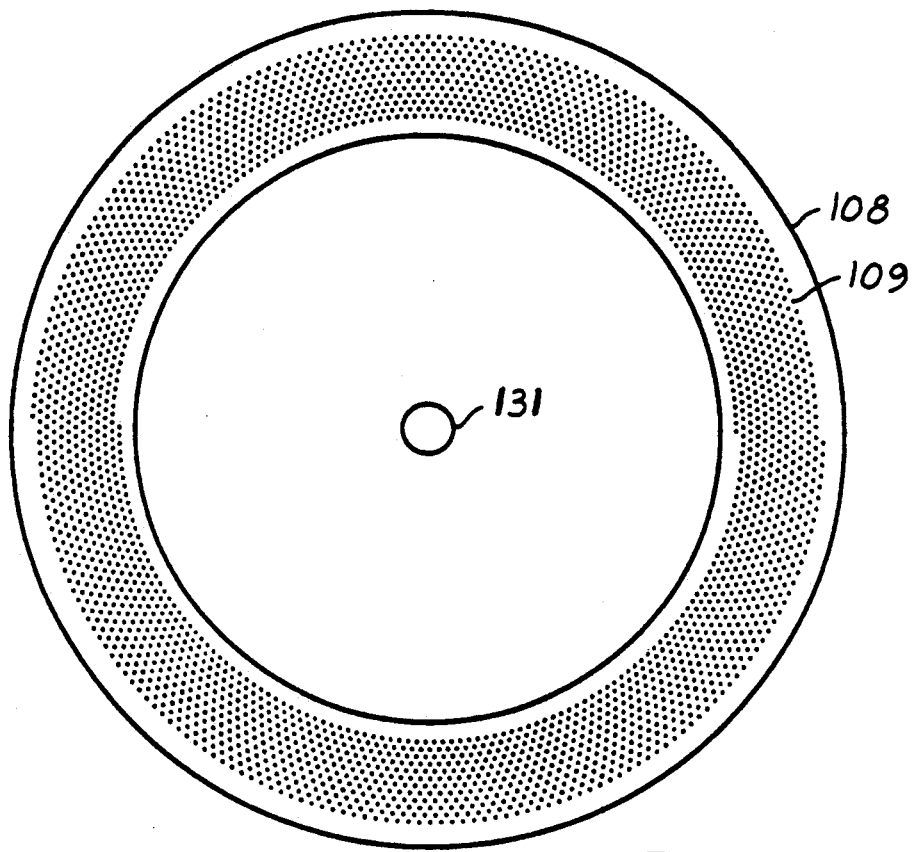
FIG. 5 is a plan view of an embodiment of a Nipkow disk used in conjunction with the zone plate of FIG. 4.

Now referring to FIGS. 3, 4, and 5, zone plate disk 106 is comprised of a plurality of focusing elements 128 which are arranged in an Archimedes spiral upon disk 106. Nipkow disk 108 includes a plurality of pin holes 109 which pass through the body of disk 108. For each pin hole 109 of Nipkow disk 108, there exists a corresponding focusing element 128 on zone plate 106. If the centers 131, 132 of disk 108 and zone plate 106 are fastened to shaft 134 of rotary motor 136, sample 116 can be scanned in a similar way to that discussed in conjunction with FIGS. 2A and 2B of the prior art. Specifically, as zone plate disk 106 and Nipkow disk 108 are rotated synchronously by motor 136, a plurality of points 122 are simultaneously scanned across specimen 116. As long as pin holes 109 are separated by a distance large enough so that there is no interaction between the image formed by the individual pin holes, a complete, high resolution image can be formed by rotating zone plate disk 106 and Nipkow disk 108 about their respective centers 132, 131. The same advantages gained by using a single focusing element are also present when employing multiple focusing elements.

Figure 6:
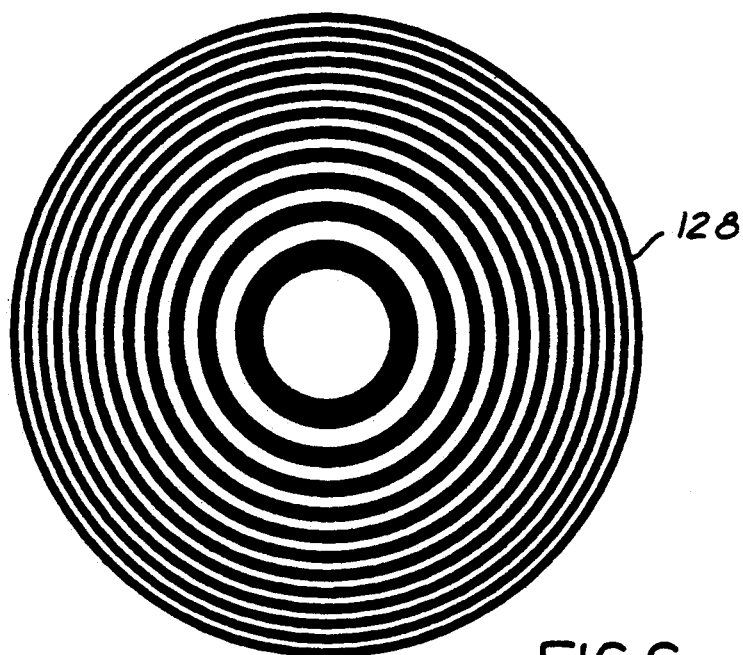
FIG. 6 is a diagrammatical depiction of one embodiment of the lens means used in the zone plate of FIG. 4.

Now referring to FIG. 6, although focusing elements 128 may comprise a Fresnel lens, a microlens, a micro concentrator, or the like, in a preferred embodiment of the present invention, focusing elements 128 are comprised of a Fresnel zone plate. Fresnel zone plate 128 is preferably created in zone plate disk 106 by using photo etching techniques well known to those skilled in the art.

In constructing the Nipkow disk of FIG. 5, a preferred method of construction involves first constructing zone plate disk 106, and then using zone plate disk 106 to focus light onto a photosensitive medium. The photosensitive medium evidences the precise location of placement of each pin hole 109. Pin holes 109 can then be placed in the Nipkow disk 108 using any number of machining, photo etching or similar techniques. A prototype of the Nipkow disk 108 and zone plate disk 106 of the present invention was constructed using the following techniques.

ZONE PLATE DISK FABRICATION

Both zone plate disk 106 and Nipkow disk 108 were made of high contrast photographic glass plates. First, a computer was used to plot a drawing of a single Fresnel zone plate (as shown in FIG. 6), and a conventional camera was used to make a photographic slide of the Fresnel zone plate drawing. Next, the slide was illuminated creating a Fresnel zone plate image. The image was reduced to the desired size (in the prototype the desired size was 1 mm in diameter) and projected upon the high contrast photographic glass plate thereby making a negative image of a single Fresnel zone plate on the glass plate. The photographic glass plate was mounted on a computer controlled rotational stage which in turn was mounted to a computer controlled translational stage. Both the rotational stage and the translational stage were controlled via stepper motors. The Archimedes spiral pattern of Fresnel zone plates, was made by using the following technique. Each time the rotational stage rotated through the constant angular separation between adjacent Fresnel zone plates, the translational stage was stepped towards the center of the disk through the corresponding constant radial separation between adjacent Fresnel zone plates. The two separations were chosen such that the distance between any two adjacent Fresnel zone plates was approximately equal to the diameter of a zone plate (1 mm). In the prototype zone plate disk, the outside radius of the spiral was approximately 43 mm and there were roughly 2,700 individual Fresnel zone plates on the zone plate disk. The individual Fresnel zone plates are arranged in two interleaved Archimedes spirals. By means of a contact photographic process, the zone plate disk (which is the photographic positive of the developed negative plate) is made from the developed negative plate.

NIPKOW DISK FABRICATION

In a prototype of the present invention, the Nipkow disk was constructed by first constructing the zone plate disk according to the previous detailed procedure and then placing the zone plate disk in its position in a confocal microscope. The zone plate disk was then illuminated with a collimated laser beam whose diameter was approximately equal to the width of the spiral. A photographic plate was then placed at the focal distance of the Archimedes spiral of Fresnel zone plates and was securely mounted to the same shaft as that which was used to rotate the Nipkow disk. The plate and disk were then rotated about their common shaft through the illuminating laser beam so that the photographic plate was exposed to the points of light projected onto its surface by each Fresnel zone plate. The projection of light onto the plate formed a negative image of the Nipkow disk. This negative evidences each location where a pin hole should be placed in a Nipkow disk. This negative was then used to make a contact photographic print (positive) of the final Nipkow disk which was used to construct a prototype confocal microscope.

GENERAL FEATURES

It is to be understood that several factors influence the size of zone plate disk 106. Normally, the larger the diameter of the Fresnel zone plate, the smaller the focal diameter of the Nipkow disk and therefore, the pin holes through the Nipkow disk can be made smaller in order to achieve better depth resolution. However in this case, the density of the pin holes will be lower, and the raster scanning may not have sufficient line density to cover the sample surface. A way to achieve a smaller focal diameter of the Nipkow disk is to reduce the focal length of the Fresnel zone plate. The extent to which the focal length of the zone plate can be reduced is limited by two factors. First, since a polarizing beam splitter is inserted between the Nipkow disk and the zone plate, the focal length must be sufficiently long to accommodate the dimensions of the beam splitter. Secondly, because the distance between the disks and the objective lens is predetermined for most optical microscopes, a shorter focal length leads to a larger focal angle. Consequently, as the focused beam passes through the pin hole at this larger angle, it may reach the objective lens with a spot size larger than the pupil size of the objective lens, thereby reducing the light transfer efficiency of the microscope. In the prototype of the present invention, the diameter of each zone plate was chosen to be 1 mm and its focal length to be 20 mm. Theoretically the diameter of the beam at the focal point is approximately equal to the product of the light wave length with the focal length divided by the diameter of the zone plate. In the prototype of the present invention, the focal diameter is approximately 10 microns.

The foregoing detailed description shows that the preferred embodiments of the present invention are well suited to fulfill the objects of the invention. It is recognized that those skilled in the art may make various modifications or additions to the preferred embodiments chosen here to illustrate the present invention, without departing from the spirit of the present invention. For example, the computer generation of the patterns and the photographic reductions used to construct the zone plate and Nipkow disk of the present invention were primarily chosen for convenience in constructing a prototype of the present invention. Other methods of construction may be preferred such as computer pattern generation and photolithographic techniques. Accordingly, it is to be understood that the subject matter sought to be afforded protection hereby should be deemed to extend to the subject matter defined in the appended claims, including all fair equivalents thereof.

I claim:

1. For use in a confocal microscope, a method for constructing a Nipkow disk using a zone plate disk, including the steps of:
   (A) constructing a zone plate disk, including the sub-step of disposing a plurality of focusing means along a disk, wherein said plurality of focusing means have a common focal distance,
   (B) placing a photographic plate at the focal distance of said plurality of focusing means,
   (C) illuminating said plurality of focusing means with a light source such that the illumination is passed through said plurality of focusing means and focused onto the photographic plate thereby creating an image of a plurality of points of focused illumination, and
   (D) capturing the image created on the photographic plate illuminated in step (C) and using it to construct the Nipkow disk.

2. The method of claim 1, wherein the step (C) includes illuminating said zone plate disk with a collimated laser beam.

3. The method of claim 1, wherein the step (C) includes rotating said zone plate disk about an axis of rotation.

4. The method of claim 1, wherein said focusing means is selected from the group consisting of a Fresnel zone plate, a Fresnel lens, a micro lens, and a micro funnel concentrator.

* * * * *